US012651091B2

(12) United States Patent
Vitalli

(10) Patent No.: US 12,651,091 B2
(45) **Date of Patent: \*Jun. 9, 2026**

(54) SYSTEM AND METHOD FOR AUTHENTICATING DIGITAL MEDIA INTEGRITY USING BACKEND MICRODATA ANALYSIS

(71) Applicant: David Vitalli, Brentwood, TN (US)

(72) Inventor: David Vitalli, Brentwood, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/411,218

(22) Filed: Dec. 6, 2025

(65) Prior Publication Data

US 2026/0093851 A1     Apr. 2, 2026

Related U.S. Application Data

(63) Continuation of application No. 18/805,209, filed on Aug. 14, 2024, now Pat. No. 12,579,323.

(51) Int. Cl.
*G06F 21/64* (2013.01)

(52) U.S. Cl.
CPC .................................. *G06F 21/64* (2013.01)

(58) Field of Classification Search
CPC ...................................................... G06F 21/64
See application file for complete search history.

(56) References Cited

U.S. PATENT DOCUMENTS

| | | | |
|---|---|---|---|
| 2002/0112163 A1* | 8/2002 | Ireton | H04L 9/3236 |
| | | | 713/176 |
| 2008/0065606 A1* | 3/2008 | Boys | G06F 16/951 |
| 2011/0225151 A1* | 9/2011 | Annambhotla | G06F 16/58 |
| | | | 709/219 |
| 2017/0134162 A1* | 5/2017 | Code | H04L 9/0643 |
| 2021/0037270 A1* | 2/2021 | Taylor | H04L 9/3242 |
| 2022/0269922 A1* | 8/2022 | Mathews | G06N 3/0464 |
| 2023/0360271 A1* | 11/2023 | Jindal | G06T 7/73 |
| 2024/0362790 A1* | 10/2024 | Gupta | G06T 7/11 |
| 2025/0086301 A1* | 3/2025 | Walker | G06F 21/6218 |
| 2025/0245492 A1* | 7/2025 | Kolavennu | G06F 30/27 |

* cited by examiner

*Primary Examiner* — Thomas J Dailey
(74) *Attorney, Agent, or Firm* — EDISON LAW GROUP, PLLC

(57) ABSTRACT

A system and method that authenticates the integrity of digital images and videos by analyzing backend microdata to detect alterations, filters, or AI-generated manipulations. This system provides a comparison of the original and modified states of digital media, assess the authenticity of the content, and confirm the identity of depicted subjects, providing a critical tool against misinformation and unauthorized media manipulation.

15 Claims, 4 Drawing Sheets

200

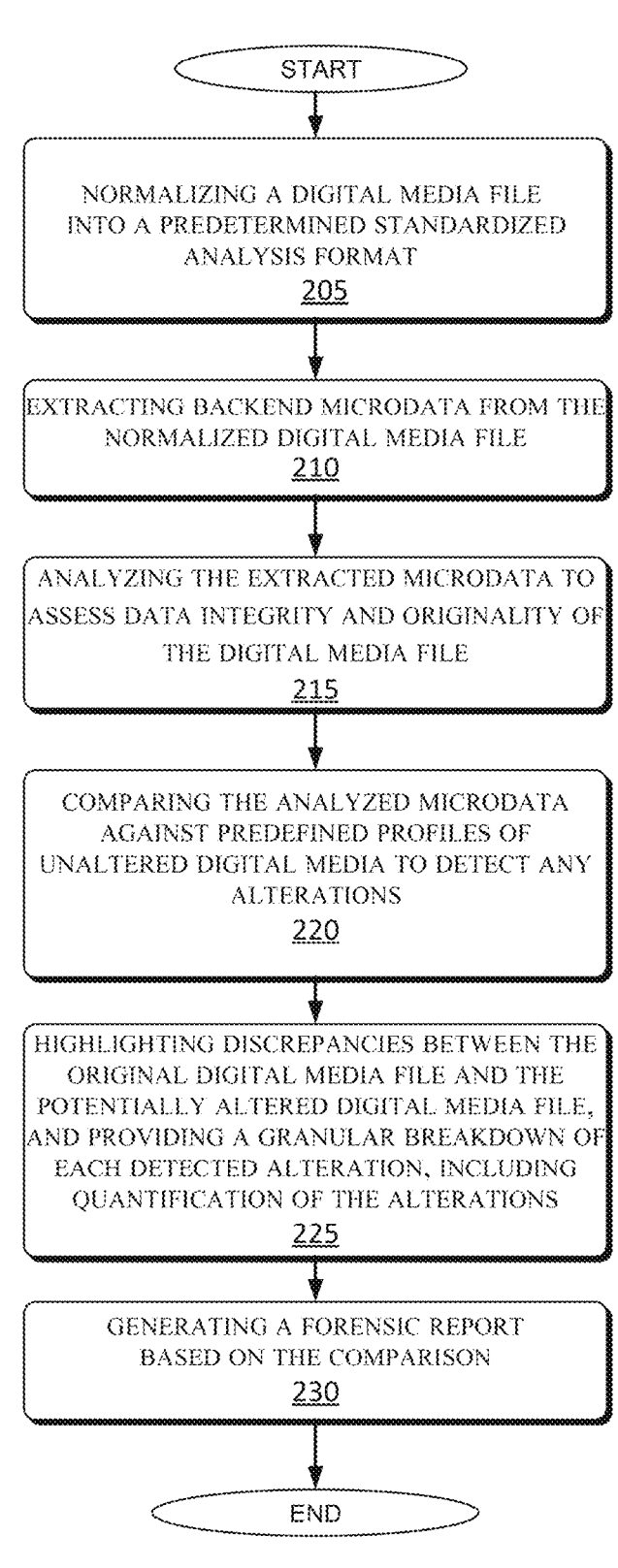

START

NORMALIZING A DIGITAL MEDIA FILE
INTO A PREDETERMINED STANDARDIZED
ANALYSIS FORMAT
205

EXTRACTING BACKEND MICRODATA FROM THE
NORMALIZED DIGITAL MEDIA FILE
210

ANALYZING THE EXTRACTED MICRODATA TO
ASSESS DATA INTEGRITY AND ORIGINALITY OF
THE DIGITAL MEDIA FILE
215

COMPARING THE ANALYZED MICRODATA
AGAINST PREDEFINED PROFILES OF
UNALTERED DIGITAL MEDIA TO DETECT ANY
ALTERATIONS
220

HIGHLIGHTING DISCREPANCIES BETWEEN THE
ORIGINAL DIGITAL MEDIA FILE AND THE
POTENTIALLY ALTERED DIGITAL MEDIA FILE,
AND PROVIDING A GRANULAR BREAKDOWN OF
EACH DETECTED ALTERATION, INCLUDING
QUANTIFICATION OF THE ALTERATIONS
225

GENERATING A FORENSIC REPORT
BASED ON THE COMPARISON
230

END

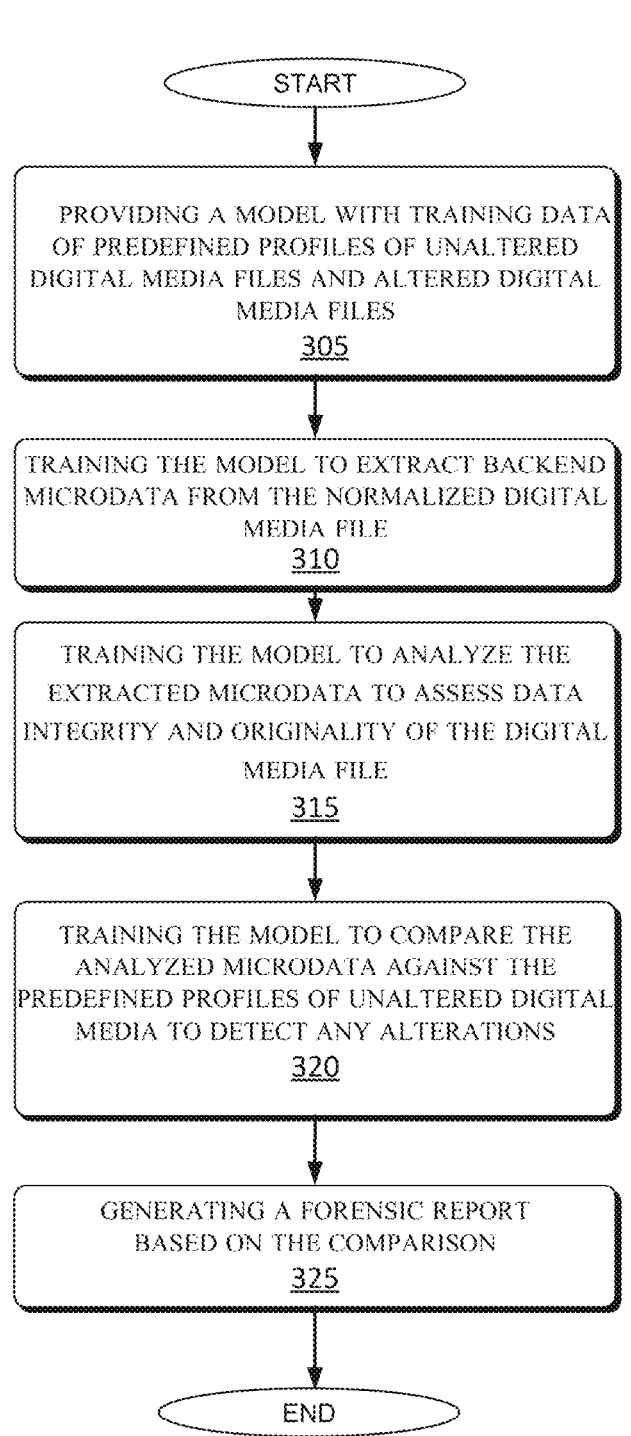

START

PROVIDING A MODEL WITH TRAINING DATA
OF PREDEFINED PROFILES OF UNALTERED
DIGITAL MEDIA FILES AND ALTERED DIGITAL
MEDIA FILES
305

TRAINING THE MODEL TO EXTRACT BACKEND
MICRODATA FROM THE NORMALIZED DIGITAL
MEDIA FILE
310

TRAINING THE MODEL TO ANALYZE THE
EXTRACTED MICRODATA TO ASSESS DATA
INTEGRITY AND ORIGINALITY OF THE DIGITAL
MEDIA FILE
315

TRAINING THE MODEL TO COMPARE THE
ANALYZED MICRODATA AGAINST THE
PREDEFINED PROFILES OF UNALTERED DIGITAL
MEDIA TO DETECT ANY ALTERATIONS
320

GENERATING A FORENSIC REPORT
BASED ON THE COMPARISON
325

END

FIG. 3

DIGITAL MEDIA AUTHENTICATOR
425

INPUT AND CLEANING MODULE
440

ALTERATION DETECTION ENGINE
446

FORENSIC ANALYSIS
450

MICRODATA EXTRACTION
ENGINE    442

AUTHENTICITY AND
PROVENANCE VERIFICATION
448

VISUAL COMPARISON TOOL
444

COMMUNICATION MODULE
452

MACHINE LEARNING
454

CPU
404

CACHE
404

SSD/HDD
406

RAM/ROM
408

402

INPUT/
OUTPUT
410

DISPLAY
414

COMM.
INTERFACE
416

SYSTEM AND METHOD FOR AUTHENTICATING DIGITAL MEDIA INTEGRITY USING BACKEND MICRODATA ANALYSIS

CROSS-REFERENCE TO RELATED APPLICATIONS

This application is a continuation of U.S. Ser. No. 18/805,209, filed on Aug. 14, 2024, which is incorporated by reference herein in its entirety.

BACKGROUND

Technical Field

The present disclosure generally relates to relates to digital media forensics. More specifically, the system relates to systems and methods for authenticating the integrity of digital images and videos.

Description of the Related Art

With the increasing sophistication of digital manipulation tools and the advent of artificial intelligence technologies, unauthorized alterations of digital media have become more prevalent and sophisticated. These alterations pose significant risks such as misinformation, which can lead to widespread consequences in media, legal, and security domains. Depending on the context, the reactions of such unauthorized alterations can result in violence against people whose words have been adulterated by such manipulations. Existing technologies often struggle to detect nuanced manipulations, leading to a demand for more advanced and reliable methods to determine the authenticity of digital media.

SUMMARY

In one embodiment, a system and method authenticates the integrity of digital images and videos. The system utilizes a series of analytical steps involving the extraction and analysis of backend microdata from digital files to uncover alterations and confirm media authenticity. The system and method of the present disclosure combines microdata analysis with machine learning and advanced imaging techniques to offer a robust solution for verifying digital media integrity.

In an embodiment, a computer-implemented method to authenticate the integrity of digital media, includes normalizing a digital media file into a predetermined standardized analysis format, extracting backend microdata from the normalized digital media file; and analyzing the extracted microdata to assess data integrity and originality of the digital media file. The analyzed microdata is compared against predefined profiles of unaltered digital media to detect any alterations; and a forensic report is generated based on the comparison.

In an embodiment, which may be combined with one or more of the preceding embodiments, the computer-implemented method further includes the operation of receiving the digital media file or a link to the digital media file, and an authentication request.

In an embodiment, which may be combined with one or more of the preceding embodiments, the extracting the of backend microdata includes extracting embedded timestamps.

In an embodiment, which may be combined with one or more of the preceding embodiments, the extracting of the backend microdata includes extracting metadata.

In an embodiment, which may be combined with one or more of the preceding embodiments, the extracting backend microdata includes extracting hash values.

In an embodiment, which may be combined with one or more of the preceding embodiments, the analyzing of the extracted backend microdata includes assessing data integrity and originality of the digital media file includes determining source devices, checking consistency in a creation of timestamps in the extracted microdata, and verifying a geographic metadata.

In an embodiment, which may be combined with one or more of the preceding embodiments, the assessing a likelihood of the digital media file being generated by Artificial Intelligence (AI) is performed by comparing the digital media file against baseline characteristics of known AI-generated and naturally occurring digital media files.

In an embodiment, which may be combined with one or more of the preceding embodiments, the analyzing of microdata against predefined profiles of unaltered digital media includes comparing an original media with a potentially altered media; and highlighting discrepancies between the original media and the potentially altered media, and providing a granular breakdown of each detected alteration, including quantification of the alterations.

In an embodiment, which may be combined with one or more of the preceding embodiments, the generating of the forensic report includes providing details of any detected alterations.

In an embodiment, which may be combined with one or more of the preceding embodiments, the generating of the forensic report further includes synthesizing the analysis of the extracted microdata into a comprehensive forensic report about the digital media file that includes findings on alterations, authenticity scores, provenance data, and visual overlays.

In an embodiment, which may be combined with one or more of the preceding embodiments, the generating of the forensic report includes providing an authenticity score based on the comparison of the analyzed microdata against the predefined profiles of the unaltered digital media.

In an embodiment, which may be combined with one or more of the preceding embodiments, the training of a model with machine learning is performed by extracting the backend microdata from the normalized digital media file, analyzing the extracted microdata to assess data integrity and originality of the digital media file, and comparing the analyzed microdata against predefined profiles of unaltered digital media to detect any alterations.

In an embodiment, which may be combined with one or more of the preceding embodiments, the training of the model with machine learning includes performing supervised learning in a training mode by providing predefined profiles of unaltered digital media and altered digital media.

In an embodiment, which may be combined with one or more of the preceding embodiments, the training of a model for a neural network or a deep learning neural network to analyze the extracted microdata to assess data integrity and originality of the digital media file, and compare the analyzed microdata against predefined profiles of unaltered digital media to detect any alterations.

In an embodiment, a system to authenticate the integrity of digital media, the system includes one or more processors; a memory coupled to the processor, the memory storing non-transitory executable instructions to cause the one or more processors to perform acts including: normalizing a digital media file into a predetermined standardized analysis format; extracting backend microdata from the normalized digital media file; analyzing the extracted microdata to assess data integrity and originality of the digital media file; comparing the analyzed microdata against predefined profiles of unaltered digital media to detect any alterations; and generating a forensic report based on the comparison.

In an embodiment, which may be combined with one or more of the preceding embodiments, the instructions cause the one or more processors to perform additional acts including: analyzing the extracted backend microdata by assessing data integrity and originality of the digital media file through determining source devices, checking consistency in a creation of timestamps in the extracted microdata, and verifying a geographic metadata.

In an embodiment, which may be combined with one or more of the preceding embodiments, the instructions cause the one or more processors to perform additional acts that include comparing the analyzed microdata against predefined profiles of unaltered digital media files includes comparing an original digital media with a potentially altered digital media file; and highlighting discrepancies between the original digital media file and the potentially altered digital media file, and providing a granular breakdown of each detected alteration, including quantification of the alterations.

In an embodiment, which may be combined with one or more of the preceding embodiments, the instructions cause the one or more processors to perform additional acts of extracting the backend microdata by extracting embedded timestamps, and/or metadata, and/or hash values.

In an embodiment, which may be combined with one or more of the preceding embodiments, the instructions cause the one or more processors to perform additional acts of assessing a likelihood of the digital media file being generated by Artificial Intelligence (AI) by comparing the digital media file against baseline characteristics of known AI-generated and naturally occurring digital media files.

In an embodiment, a computing device to authenticate digital media files, the computing device includes: a memory; a processor in communication with the memory, the processor is configured with a plurality of modules to execute authentication of digital media files including an input and cleaning module that includes preprocessing functionalities to convert incoming digital media files into a standard format amenable to detailed analysis. A microdata extraction module that extracts backend microdata from the digital media files and decodes data structures to verify their integrity against original data profiles. An alteration detection module that utilizes one or more of deterministic and/or probabilistic methods to compare the extracted backend microdata against a database of known profiles of unaltered media. A visual comparison that creates detailed visual overlays to compare an original media file with a potentially altered media to highlight discrepancies and provide a granular breakdown of each detected alteration including quantification of the alterations. An authenticity and provenance verification module that identifies source devices, checks for consistency of timestamps creation, verifies a geographic metadata, and assesses a likelihood of the digital media file being AI-generated by comparison against baseline characteristics of known AI-generated media files and naturally occurring media files; and a forensic analysis module that synthesizes an analysis of the extracted backend microdata into a comprehensive forensic report that includes findings on alterations, authenticity scores, provenance data, and visual overlays.

In an embodiment, which may be combined with one or more of the preceding embodiments, the computing device further includes a machine learning module configured to the train a model with machine learning in a training mode by providing predefined profiles of unaltered digital media and altered digital media.

In an embodiment, a non-transitory computer-readable storage medium including a computer-readable program code having computer readable instructions, that when executed, causes a computer to carry out a method of digital authentication of a digital media file by normalizing a digital media file into a predetermined standardized analysis format; extracting backend microdata from the normalized digital media file; analyzing the extracted microdata to assess data integrity and originality of the digital media file; comparing the analyzed microdata against predefined profiles of unaltered digital media to detect any alterations; and generating a forensic report based on the comparison.

BRIEF DESCRIPTION OF THE DRAWINGS

The drawings presented herein show illustrative embodiments of the disclosure. They do not illustrate all embodiments. Other embodiments may be used in addition to or instead of the illustrative embodiments. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps. The drawings are not intended to depict every feature of every implementation nor relative dimensions of the depicted elements, and are not drawn to scale.

FIG. 2 is a flowchart for a computer-implemented method for authenticating digital media, consistent with an illustrative embodiment.

FIG. 3 is a flowchart illustrating training of a model for authenticating digital media with machine learning, consistent with an illustrative embodiment.

DETAILED DESCRIPTION

Figure 1:
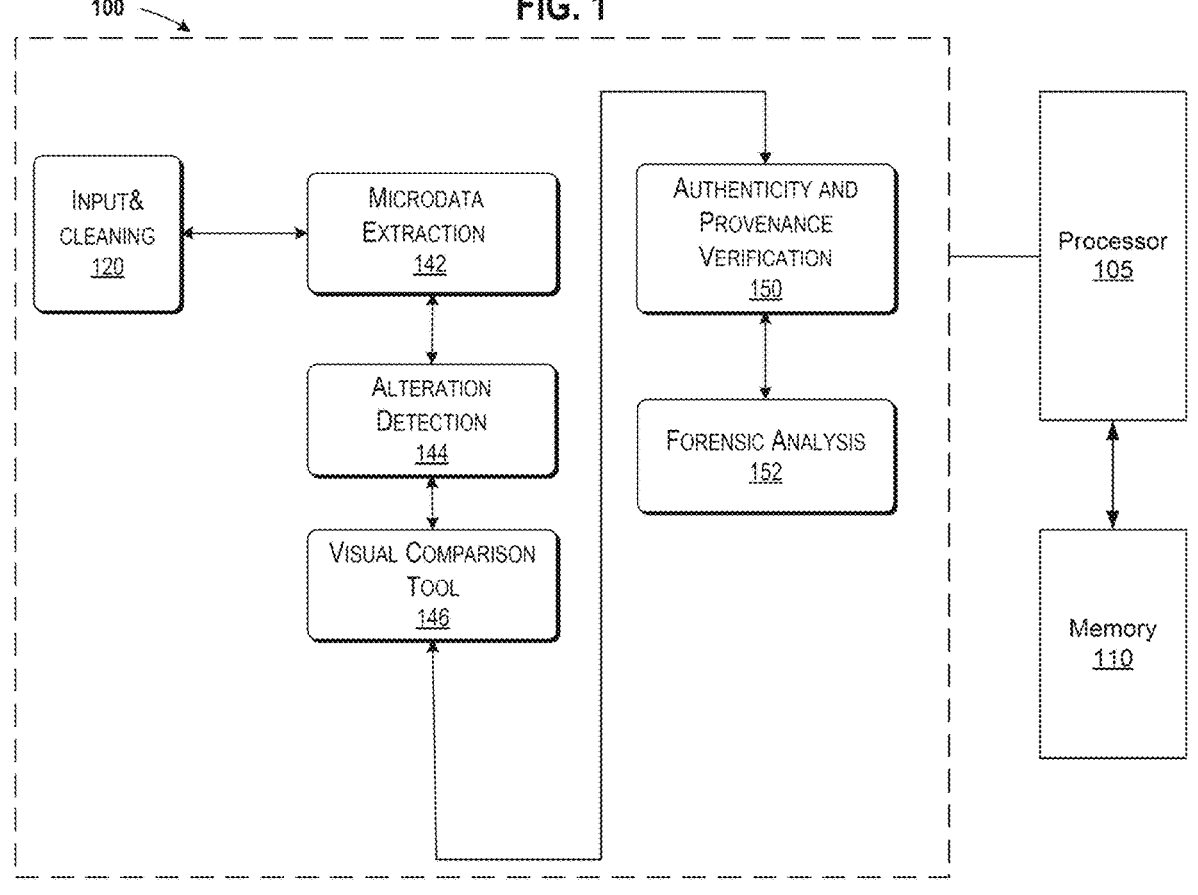
FIG. 1 illustrates is an overview of a computing device for authenticating digital media, consistent with an illustrative embodiment.

In the following description, numerous specific details are set forth to clearly describe various specific embodiments disclosed herein. One skilled in the art, however, will understand that the subject matter of the present disclosure may be practiced without all of the specific details discussed below. In other instances, well-known features may not have been described so as not to obscure the invention with unnecessary detail regarding known features.

As used herein, the term "and/or" is to be interpreted broadly is to be understood to refer to all or some of the elements. For example, "at least one of (a) and/or (b) means the teaching pertains only to element (a), or only to element (b), or to both element (a) and element (b). In another example, "at least one of (a), (b), and/or (c), means the teaching pertains to only element (a), or only to element (b), or only element (c), or to elements (a) and (b), elements (a) and (c), elements (b) and (c), or to all of (a), (b) and (c).

As used herein the term "digital media file" is to be interpreted broadly and is to be understood to refer to ref to still images, video, audio, audio-visual, GIF images, etc.

Also, it is to be understood that the phraseology and terminology used herein is for the purpose of description and should not be regarded as limiting. The use of "including," comprising, "or "having" and variations thereof herein is meant to encompass the items listed thereafter and equivalents thereof as well as additional items. Unless limited otherwise, the terms "connected," coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software. As such, it should be noted that a plurality of hardware and software-based devices, as well as a plurality of different structural components may be utilized to implement the subject matter of the present disclosure. Furthermore, and as described in subsequent paragraphs, the specific mechanical configurations illustrated in the drawings are intended to exemplify embodiments of the subject matter of the present disclosure. Overview The teachings of the present disclosure provide for an improvement in the field of digital authentication, and provide for an improvement in computer technology. For example, in the computer-implemented method of the present disclosure, a more accurate determination as to whether or not a digital media data file has altered, typically without permission from the original content creator. Through the use of a all of the analysis by the various engines/modules as disclosed herein, the digital media authentication as discussed herein provides for a more efficient operation of a computer, saving on compute resources. For example, through the use of machine learning to train a model with samples of original and altered content, a more efficient forensic analysis is provided.

FIG. 1 illustrates is an overview of a computing device 100 for authenticating digital media, consistent with an illustrative embodiment. It is to be understood that the components shown in FIG. 1 are provide for illustrative purposes, and the present disclosure is not limited to the arrangement shown. A number of the components shown are optional, and there may be few components arranged differently than shown.

The computing device 100 may be a server, tower computer, desktop computer, just to name some non-limiting examples. The computing device may also be a handheld device such as a smartphone loaded with an app hat performs authentication functions. There is shown a processor 105 (which may be embodied as multiple processors) and a memory 110. The computing device also includes or is coupled to a communication component or device that can retrieve or receive a digital media file(s) to perform an authentication operation. The digital file(s) may be sent via a user request, or a link to retrieve such digital media files may be sent. The processor(s) 105 may be configured to search the Internet periodically based on certain keywords or images to determine if there are any posts related to a particular subject. In a non-limiting example, an app such as Browse-AIR may search Twitter (X*), Instagram*, You-Tube*, etc., for certain subject matter that is desired to be monitored to ensure that altered/unauthorized digital media is not being posted online.

The processor(s) 105 may be configured with various engines and/or modules for operation of the authentication. The input and cleaning module 120 may operate as an interface between the processor (105) and other I/O devices. One of the operations of the input and cleaning module 120 includes preprocessing functionalities to convert incoming digital media files into a standard format amenable to detailed analysis. The input and cleaning module 120 may also operate to clean data received from various formats. For example, duplicate files, inconsistencies, mislabeling, corrupt data, improperly formatted, errors or incomplete entries within the data are identified and corrected. The input module is designed to handle a variety of digital media formats.

The microdata extraction engine 142 extracts backend microdata from the digital media files, which includes but is not limited to metadata, hash values, digital signatures, and embedded timestamps. The microdata extraction engine 142 incorporates specialized algorithms to decode complex data structures and verify their integrity against original data profiles.

The alteration detection engine 144 utilizes both deterministic and probabilistic methods to compare the extracted microdata against a database of known profiles of unaltered media. The alteration detection engine 144 integrates machine learning models that have been trained on a diverse dataset of manipulated and unmanipulated media to identify discrepancies and patterns indicative of manipulation.

A visual comparison tool 146 creates detailed visual overlays that compare the original media with the potentially altered media. The visual comparison tool 146 employs state-of-the-art imaging techniques to highlight discrepancies and provides a granular breakdown of each detected alteration, including quantification of the alterations.

The authenticity and provenance verification engine 150 determines the source and originality of the media. The authenticity and provenance verification engine 150 identifies the source devices, checks for consistency in creation timestamps, and verifies the geographic metadata. There is also an assessment of the likelihood of media being AI-generated by comparing it against baseline characteristics of known AI-generated and naturally occurring media.

The forensic analysis module 152 synthesizes the analysis into a comprehensive forensic report that includes findings on alterations, authenticity scores, provenance data, and visual overlays. The forensic analysis module 152 offers functionality to export results in formats suitable for legal examination, media verification, or security analysis.
Computer-Implemented Method According to some illustrative embodiments, the presently disclosed system may be implemented using a computing device such as, for example, computer, mobile phone, cellular phone, 1 tablet, and/or laptop. According to some embodiments, an App may be implemented using a computing device such as, for example, a computer, mobile phone, cellular phone, tablet, and/or laptop.

The computing device may have more or fewer components than described below, may combine two or more components, or a may have a different configuration or 8 arrangement of the components. The various components described below may be implemented in hardware, software or a combination of both hardware and software, including one or more signal processing and/or application-specific integrated circuits.

According to some embodiments, the computing device may have a memory (which may include one or more computer-readable storage mediums), one or more processing units (e.g., CPU's), an audio circuitry, a speaker, in accordance with some embodiments, these components may communicate over one or more communication buses or signal lines.

The memory may include high-speed random-access memory and/or non-volatile memory, such as one or more magnetic disk storage devices, flash memory devices, or other non-volatile solid-state memory devices. Access to memory by other components of the computing device, such as the CPU may be controlled by a memory controller.

The computing device and/or the chip(s) may include a radio frequency (RF) circuitry. The radio frequency (RF) circuitry may be configured to receive and transmit RF signals, also called electromagnetic signals. The RF circuitry may communicate with networks such as the Internet, also referred to as the World Wide Web (WWW), an Intranet and/or a wireless network, such as a cellular telephone network, a wireless local area network (LAN) and/or a metropolitan area network (MAN), and other devices by wireless communication.

Computer-Implemented Method

With the foregoing overview of the example architecture, it may be helpful now to consider a high-level discussion of an example process. To that end, FIG. 2 is a flowchart 200 for a computer-implemented method for authenticating digital media, consistent with an illustrative embodiment. In addition, FIG. 3 is a flowchart 300 illustrating training of a model for authenticating digital media with machine learning, consistent with an illustrative embodiment. The computer-implemented methods described in FIGS. 2 and 3 may be performed with a computing device and/or system such as described in FIGS. 1 and 4.

FIGS. 2 and 3 are shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement data. In each process, the order in which the operations are described is not intended to be construed as a limitation, and any number of the described blocks can be combined in any order and/or performed in parallel to implement the process.

Referring now to FIG. 2, a digital media file is normalized into a predetermined standardized analysis format (operation 205). For example, the input and cleaning module 120 cleans data received from one or more formats. For example, duplicate files, inconsistencies, mislabeling, corrupt data, improperly formatted, errors or incomplete entries within the data are identified and corrected to that a proper authentication operation may be performed.

Backend microdata is extracted from the normalized digital media file (operation 210). For example the microdata extraction engine 142. As previously, the backend microdata includes but is not limited to one or more of metadata, hash values, digital signatures, and embedded timestamps. Specialized algorithms may decode complex data structures and verify their integrity against original data profiles The extracted microdata is analyzed to assess data integrity and originality of the digital media file (operation 215). For example, both deterministic and probabilistic methods may be used to compare the extracted microdata against a database of known profiles of unaltered media.

The analyzed microdata is compared against predefined profiles of unaltered digital media to detect alterations (operation 220). It should be noted that operations 215 and 220 may be considered a single operation. Through the comparison, the alteration detection engine 144 identifies discrepancies and patterns indicative of manipulation.

The discrepancies between the original media data and the potentially altered digital media file are highlighted, and a granular breakdown of each detected alteration, and a quantification of the alterations, may be provided (operation 225). The visual comparison tool 146 (discussed with reference to FIG. 1) may create detailed visual overlays that compare the original media with the potentially altered media. The authenticity and provenance verification engine 150 determines the source and originality of the media. The authenticity and provenance verification engine 150 identifies the source devices, checks for consistency in creation timestamps, and verifies the geographic metadata. The likelihood of media being AI-generated is assessed by comparing the microdata against baseline characteristics of known AI-generated and naturally occurring media.

A forensic report based on the comparison of the analyzed microdata as discussed above may be generated (operation 230). For example, the forensic analysis module 152 synthesizes the analysis into a comprehensive forensic report that includes findings on alterations, authenticity scores, provenance data, and visual overlays. The forensic analysis module 152 offers functionality to export results in formats suitable for legal examination, media verification, or security analysis.

It is to be understood that the computer-implemented method of FIG. 2 is not limited to the operations discussed herein above and may include other operations.

FIG. 3 is a flowchart 300 illustrating training of a model for authenticating digital media with machine learning, consistent with an illustrative embodiment. It is to be understood hat this flowchart is provided for illustrative purposes, and the appended claims are not limited to the operations discussed in this flowchart.

A model is provided with a training data of predefined profiles of unaltered digital media files and altered digital media files (operation 305). The model may be, for example, a digital media authenticator 425 (FIG. 4) using a machine learning module 454.

The model is trained to extract backend microdata from the normalized digital media file (operation 310). As the extracted microdata may include but is not limited to hash values, timestamps, metadata, hash values, digital signatures, and embedded timestamps. This microdata may be extracted a number of ways, including but not limited to webcrawlers, browsers, etc.

The model is trained to analyze the extracted microdata to assess data integrity and originality of the digital media file (operation 315). A diverse dataset of manipulated and unmanipulated media to identify discrepancies and patterns indicative of manipulation.

The model may be trained to compared the analyzed microdata against the predefined profiles of unaltered digital media to detect alterations (operation 320). The learning may be supervised or unsupervised. Supervised learning with samples tagged is a more efficient ay to train the model. However, unsupervised models may be advantageous in having the computing device discover patterns of altered data that may not be recognized with a supervised learning.

The model may be trained to generate a forensic report on the comparison taught in the operations described above (operation 325). This report may be similar to the description indicated above. It is to be understood that other types of Artificial Intelligence (AI) may be used other than machine learning. As discussed above, neural networks and/or deep neural networks may be used to perform digital media authentication.

System for Authentication

Figure 4:
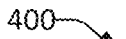
FIG. 4 is an illustration of a system for authenticating digital media, consistent with an illustrative embodiment.

FIG. 4 illustrates a system 400 for digital media authentication, consistent with an illustrative embodiment. It is to be understood that in practice a system may have more or fewer components than shown, and the functionality of various components may be combined. With reference to FIG. 4, a system with one or more buses enables one or more processors configured with software to communicate with various components as discussed herein below.

There may be one or more processors (CPU 404), and the storage 406 may be an optical storage, and/or may include an SDD or more conventional HDD storage. The storage 406 may include a cache memory 404, and may include data stores. RAM/ROM 408, optional input/output device(s) (e.g., keyboard, a mouse, a display 414, and a communication interface 416 are connected to a bus 402. The communication interface 416 may be connected to a router, and may be transmitted by any known wired or wireless communication to users via the Internet. The present disclosure is not limited to any particular communication protocol.

A digital media authenticator 425 may include several modules that were described with regard to FIG. 1, such as an input and cleaning module 440, a microdata extraction engine 442, a visual comparison tool 444, an alteration detection engine 446, and authenticity and provenance verification module 448, a communication module 452, a forensic analysis module 450, and a machine learning module 454. The machine learning module 454 is one way that the digital media authenticator may be trained with samples to detect altered images, by training with original audio/video samples and/or altered audio/video samples.

CONCLUSION

It is to be understood that with regard to computer-implemented methods and systems described herein, computer program instructions may be provided to a processor of a general-purpose computer to render it into a special purpose computer configured to per the authentication disclosed herein. In addition, a special purpose computer, or other programmable data processing apparatus may be used to produce a machine in which the instructions are executed via the processor of the computer or other programmable data processing apparatus to provide for implementing the functions/acts specified in the flowchart and/or block diagram block or blocks.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," 'an," and "the" include plural referents unless the content clearly dictates otherwise. The term plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one", unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, paragraph (f), unless the element is expressly recited using the phrase "means for", and no method or process step herein is to be construed under those provisions unless the step, or steps, are expressly recited using the phrase "step(s) for . . . ".

What is claimed is:

1. A method to authenticate the integrity of a digital media file, comprising:
   receiving the digital media file;
   normalizing the digital media file into a predetermined standardized analysis format;
   extracting backend microdata from the normalized digital medial file;
   generating an authenticity determination for the digital media file using the extracted backend microdata, the authenticity determination comprising one or more of an authenticity score, an indication of AI-generation likelihood, a provenance assessment, or one or more discrepancy indicators;
   associating the authenticity determination with the digital media file by embedding, attaching, or linking authenticity metadata to the digital media file using information derived from the authenticity determination;
   recording the authenticity metadata in a location accessible to downstream systems or users; and
   providing an output indicating the authenticity determination for presentation to a user or receiving system.

2. The method of claim 1, wherein associating the authenticity determination with the digital media file comprises embedding authenticity metadata into a metadata field of the digital media file.

3. The method of claim 1, wherein associating the authenticity determination with the digital media file comprises attaching authenticity metadata to the digital media file as a linked descriptor stored separately from the digital media file.

4. The method of claim 1, wherein associating the authenticity determination comprises recording an authenticity reference in an external registry and linking the digital media file to the authenticity reference.

5. The method of claim 1, wherein the authenticity metadata further comprises provenance information including one or more of source device identifiers, timestamps, geolocation indicators, or combinations thereof.

6. The method of claim 1, further comprising generating a user-visible authenticity indicator based on the authenticity determination.

7. The method of claim 1, wherein the authenticity metadata is configured to persist across storage, transfer, or distribution of the digital media file.

8. A system comprising one or more processors configured to: perform the method of claim 1; and maintain a record associating the digital media file with the authenticity metadata for downstream verification.

9. The system of claim 8, wherein the system is configured to route the authenticity metadata to a human review process, an automated verification process, or a content distribution workflow.

10. The system of claim 8, wherein the system maintains a provenance chain comprising entries derived from the authenticity determination, including timestamps, device identifiers, or geographic indicators.

11. A non-transitory computer-readable medium storing instructions that, when executed by one or more processors, cause the processors to perform the method of claim 1.

12. A digital media authentication device comprising:
a module configured to normalize a digital media file into a predetermined standardized analysis format, a module to extract backend microdata from the normalized digital media file, and a module to use the extracted backend microdata to generate an authenticity determination for the digital media file; and
a metadata application module configured to associate the authenticity determination with the digital media file by embedding authenticity metadata, attaching authenticity metadata, or linking authenticity metadata to the digital media file.

13. The device of claim 12, wherein the metadata application module applies a cryptographic indicator, digital signature, or token derived from the authenticity determination.

14. The device of claim 12, wherein the metadata application module generates an authenticity manifest or descriptor comprising the authenticity determination.

15. A system comprising one or more processors configured to:
    receive a plurality of digital media files;
    normalize each of the digital media files into a predetermined standardized analysis format;
    extract backend microdata from the normalized digital media files;
    generate an authenticity determination for each digital media file using the extracted backend microdata;
    associate each authenticity determination with its corresponding digital media file by embedding authenticity metadata, attaching authenticity metadata, or linking authenticity metadata; and
    generate batch authenticity metadata for storage, distribution, or downstream verification.

* * * * *